United States Patent
Baran, Jr. et al.

(10) Patent No.: US 7,033,975 B2
(45) Date of Patent: Apr. 25, 2006

(54) USE OF SURFACE-MODIFIED NANOPARTICLES FOR OIL RECOVERY

(75) Inventors: Jimmie R. Baran, Jr., Prescott, WI (US); Oswaldo J. Cabrera, Edo. Vargas (VE)

(73) Assignee: 3M Innovative Properties Company, St. Paul, MN (US)

( * ) Notice: Subject to any disclaimer, the term of this patent is extended or adjusted under 35 U.S.C. 154(b) by 329 days.

(21) Appl. No.: 10/441,721

(22) Filed: May 20, 2003

(65) Prior Publication Data

US 2003/0220204 A1     Nov. 27, 2003

Related U.S. Application Data

(60) Provisional application No. 60/383,205, filed on May 24, 2002.

(51) Int. Cl.
    C09K 7/02    (2006.01)
    C09K 7/06    (2006.01)
    E21B 43/16   (2006.01)

(52) U.S. Cl. ............... 507/102; 507/202; 507/140; 507/269; 507/143; 507/270; 507/901; 507/906; 166/312; 166/305.1; 166/268; 977/DIG. 1

(58) Field of Classification Search ............... 507/102, 507/202, 140, 269, 143, 270, 901, 906; 166/312, 166/305.1, 268
See application file for complete search history.

(56) References Cited

U.S. PATENT DOCUMENTS

| | | |
|---|---|---|
| 2,801,185 A | 7/1957 | Iler |
| 3,814,730 A | 6/1974 | Karstedt |
| 4,455,205 A | 6/1984 | Olson et al. |
| 4,478,876 A | 10/1984 | Chung |
| 4,486,504 A | 12/1984 | Chung |
| 4,491,508 A | 1/1985 | Olson et al. |
| 4,522,958 A | 6/1985 | Das et al. |
| 4,748,061 A | 5/1988 | Vesley |
| 4,895,745 A | 1/1990 | Vesley et al. |
| 5,024,880 A | 6/1991 | Veasley et al. |
| 5,037,579 A | 8/1991 | Matchett |
| 5,067,564 A | 11/1991 | Sydansk |
| 5,087,611 A | 2/1992 | Forrest |
| 5,258,225 A | 11/1993 | Katsamberis |
| 5,489,574 A * | 2/1996 | Miano et al. ............... 507/203 |
| 5,648,407 A | 7/1997 | Goetz et al. |
| 5,780,395 A | 7/1998 | Sydansk |
| 5,834,406 A | 11/1998 | Sydansk |
| 5,910,467 A * | 6/1999 | Bragg ............... 507/202 |
| 6,103,772 A | 8/2000 | Sydansk |
| 6,105,672 A | 8/2000 | Deruyter et al. |
| 6,134,380 A | 10/2000 | Kushizaki |
| 6,227,296 B1 | 5/2001 | Reppert et al. |
| 6,391,830 B1 * | 5/2002 | Dobson et al. ............... 507/111 |
| 6,579,832 B1 * | 6/2003 | Jimenez et al. ............... 507/143 |
| 6,586,372 B1 * | 7/2003 | Bradbury et al. ............ 507/140 |
| 6,586,483 B1 | 7/2003 | Kolb et al. |
| 6,764,980 B1 * | 7/2004 | Bates et al. ............... 507/90 |
| 6,881,709 B1 * | 4/2005 | Nelson et al. ............... 507/203 |
| 2002/0149659 A1 | 10/2002 | Wu et al. |
| 2002/0192476 A1 * | 12/2002 | Kambe et al. ............... 428/447 |
| 2004/0029978 A1 | 2/2004 | Chane-Ching |
| 2004/0204323 A1 * | 10/2004 | Temple et al. ............... 507/100 |
| 2005/0016726 A1 * | 1/2005 | Nguyen et al. ............... 166/278 |
| 2005/0101493 A1 * | 5/2005 | Bradbury et al. ............ 507/269 |

FOREIGN PATENT DOCUMENTS

| | | |
|---|---|---|
| CA | 2111525 A | 6/1994 |
| WO | WO 00/06495 | 2/2000 |

OTHER PUBLICATIONS

Publication: "Oil & Gas Group Technical Effort Progress Report 1st Semester, 2001", 3M Innovation, pp. 1-12.
"Drilling Fluids", Kirk-Othmer Encyclopedia of Chemical Technology, Fourth Edition, vol. 18, pp. 370-405 (1996).
"Enhanced Oil Recovery", Kirk-Othmer Encyclopedia of Chemical Technology, Fourth Edition, vol. 18, pp. 405-425 (1996).
Product Information: Cabot Corporation, Treated Fumed Silica / CAB-O-SIL® TS-610 (2002).
Product Information: Cabot Corporation, Treated Fumed Silica / CAB-O-SIL® TS-530 (2002).
Product Information: degussa. / creating essentials, Determination of the Average Particle Size, https://www1.sivento.com/wps/portal/p3/kcxm1/Vc1JDolwGEDhs3gA8zNgXTaMRgSoEAo . . . (Sep. 7, 2005).

* cited by examiner

Primary Examiner—Philip C. Tucker

(57) ABSTRACT

The present invention provides the use of surface-modified nanoparticles in fluids used to recover hydrocarbon from underground formations. The use of surface-modified nanoparticles in such fluids provides foams that are stable under pressure yet have a shorter foam lifetime than typical surfactant-stabilized foams after the pressure is released or lowered.

47 Claims, No Drawings

USE OF SURFACE-MODIFIED NANOPARTICLES FOR OIL RECOVERY

CROSS REFERENCE TO RELATED APPLICATION

This application claims priority to U.S. Provisional Patent Application No. 60/383,205, filed on May 24, 2002.

BACKGROUND

The invention relates to the use of foams to enhance oil recovery. Foams in the oil industry are basically used in three different applications. The first application is for blocking the breakthrough of water or gas that is being used as a secondary oil recovery technique by pushing the oil to a receiving well. The foam flows to the higher permeable zone in the formation and acts to decrease the permeation of that zone, in order to block the breakthrough. The second application is for using the foam itself as an agent to push the oil to a receiving well in secondary oil recovery. The final application is the use of foams in low density drilling muds to aid in removal of drilling debris.

Typically surfactants, for example, fluorinated surfactants, are used for these applications because they can efficiently and effectively foam both water and oil, without emulsification. Since the fluorinated surfactants do not participate in emulsification, less surfactant can be used, offsetting the cost of fluorinated surfactants. Fluorinated surfactants are also the surfactants of choice in these applications because they remain surface active under the harsh conditions experienced in an oil formation, e.g., high temperature/pressure, high electrolyte concentrations, etc.

The foams produced from using fluorinated surfactants are very stable. However, this stability can be an issue once the foams are recovered on the surface, since it is desirable to break these foams for further work-up of the produced oils. Another undesirable characteristic of surfactant is that they can leave residue behind on the formation.

SUMMARY

The present invention provides the use of surface-modified nanoparticles in fluids used to recover hydrocarbon from underground formations. The use of surface-modified nanoparticles in such fluids provides foams that are stable under pressure yet have a shorter foam lifetime than typical surfactant-stabilized foams after the pressure is released or lowered.

In one embodiment, the invention provides a method of recovering hydrocarbon from a permeable formation. The method comprises the steps of injecting a fluid under pressure into the permeable formation through one or more injection wells and recovering the hydrocarbons through one or more production wells, wherein the fluid foams while under pressure and said foam substantially breaks when the pressure is relieved, the fluid comprising a foam composition comprising solvent, surface-modified nanoparticles, and a foaming agent.

In another embodiment, the invention provides a method for controlling the mobility of a fluid in a hydrocarbon-bearing formation. The method comprises the steps of incorporating a foam into the hydrocarbon-bearing formation in association with a fluid to control the mobility of said fluid, wherein said foam is formed from a foam composition comprising foaming agent, solvent, and surface-modified nanoparticles disposed in said solvent.

In another embodiment, the invention provides a method of well drilling wherein a drilling fluid is circulated in a well drilled into the ground. The method comprises the steps of injecting under pressure a foamed drilling fluid into the well, contacting the debris with the foamed drilling fluid, and directing the debris and foamed drilling fluid out of the well, wherein the drilling fluid comprises a foam composition comprising solvent, foaming agent, and surface-modified nanoparticles.

In other embodiments, surface-modified nanoparticles are used in combination with surfactant in such fluids. Typically, the addition of surface-modified nanoparticles in such fluids containing surfactant permits the use of a lower amount of surfactant to achieve similar performance as compared to using surfactant alone.

The term "surface-modified nanoparticle" refers to a particle that includes surface groups attached to the surface of the particle. The surface groups modify the character of the particle.

The term "persistent foam" refers to the presence of gas voids in a composition for a period greater than 1 minute after the composition has been foamed.

The terms "particle diameter" and "particle size" refer to the maximum cross-sectional dimension of a particle. If the particle is present in the form of an aggregate, the terms "particle diameter" and "particle size" refer to the maximum cross-sectional dimension of the aggregate.

The term "fluid" is meant to encompass both liquids and gels.

The term "solvent" is meant to encompass aqueous and organic based solvent (non-aqueous), for example, water and diesel oil used in the oil recovery industry.

DETAILED DESCRIPTION

The use of fluids and foams to enhance oil recovery is well known. Such fluids and foams may be used as injection fluids or foams to push hydrocarbon out of the formation. For example, a fluid, typically containing from 2–5 wt. % surfactant, may be foamed in order to provide a fluid to displace or push hydrocarbon from a formation. This is also known as increasing the oil displacement efficiency of the injected fluid. The foams may also be used as mobility control or blocking foams which block permeable areas of the formation allowing an injected gas or fluid to be redirected to less permeable area of the formation where the hydrocarbon is trapped. This is also known as increasing the volumetric sweep efficiency of the injected gas or fluid. Surfactants have been combined with aqueous fluids to form foams that reduced the mobility of gases in the formation. Other methods of enhanced oil recovery are described in U.S. Pat. Nos. 6,105,672; 6,227,296; 5,834,406; and 5,780,395, and incorporated by reference herein.

The present invention provides the use of surface-modified nanoparticles in methods of oil or hydrocarbon recovery where foams or foamed fluid is used. In certain oil or hydrocarbon recovery methods, surface-modified nanoparticles can replace surfactant as the foaming agent where lowering the surface tension of the fluid is not required. In applications where a reduction in the surface tension of the fluid is desired, surface-modified nanoparticles can be used with surfactants. In this case, a lower concentration of surfactant may typically be used to obtain a foam having the same characteristics as a foam made using surfactant alone.

Drilling fluids are also well known and are generally composed of liquids, for example, water, petroleum oils, and other organic liquids; dissolved inorganic and organic additives; and suspended, finely divided solids. Drilling fluids are typically pumped into the well during drilling and then pumped back up to the surface for disposal, treatment, or re-using in the well. Drilling fluids are used to remove formation cutting and any drill bit fragments from beneath the bit and transports these cutting to the surface, prevent influx of formation fluids into the wellbore, seal exposed permeable formations, maintains the stability of exposed formations, cools and lubricates the bit, and helps suspend the weight of the drill string and casing.

The present invention also provides the use of surface-modified nanoparticles in drilling fluids where a drilling fluid that foams is desirable. Like oil recovery fluids, surface-modified nanoparticles may be used in place of or in combination with surfactant to provide a drilling fluid that foams.

A typical well-drilling and bore system will now be described. A bore is drilled into a formation by means of any suitable known drilling equipment, including a drill pipe and a drill bit. For purposes of the present invention, the drill pipe is a hollow conduit through which a drilling fluid may pass down into the well. An annulus is defined between the exterior of the drill pipe and the wall of the bore to provide passage of the drilling fluid and debris out of the well. A tank or vessel for holding the drilling fluid is connected to a pump which is connected to the hollow interior of the drill pipe. A liner may also be inserted into the bore to maintain its integrity. Debris, such as rock, dirt, and clay, is created by drilling. The debris is removed by directing the foamed drilling fluid from the tank through the drill pipe and through the annulus where the foamed drilling fluid contacts the debris and carries it to the surface of the well-bore to the outlet conduit. The foamed drilling fluid thereby sweeps the debris from the well-bore as it is forced through the annulus and to the surface. The drilling fluid/debris mixture can then be separated and the drilling fluid used re-circulated or disposed.

The surface-modified nanoparticles are preferably individual, unassociated (i.e., non-aggregated) nanoparticles dispersed throughout the solvent and preferably do not irreversibly associate with each other. The term "associate with" or "associating with" includes, for example, covalent bonding, hydrogen bonding, electrostatic attraction, London forces, and hydrophobic interactions.

The surface-modified nanoparticles are selected such that the composition formed therewith is free from a degree of particle agglomeration or aggregation that would interfere with the desired properties of the composition including the ability of the composition to foam. The surface-modified nanoparticles are selected to be compatible with the solvent to be foamed. For solvents that include a variety of components, the surface-modified nanoparticles may be selected to be compatible with at least one component of the solvent.

The surface-modified nanoparticles have surface groups that modify the solubility characteristics of the nanoparticles. The surface groups are selected to render the particle compatible with the solvent, including, e.g., a component of the solvent, in which the particle is disposed such that the resulting composition, upon foaming, forms a persistent foam.

One method of assessing the compatibility of the surface-modified nanoparticles with the solvent includes determining whether the resulting composition forms a persistent foam when a foaming agent is introduced into the composition. For transparent solvents, one useful method of assessing the compatibility of the surface-modified nanoparticles with the transparent solvent includes combining the surface-modified nanoparticles and the solvent and observing whether the surface-modified nanoparticles appear to dissolve in the solvent such that the resulting composition is transparent. The nature of the inorganic particle component of the surface-modified particle will prevent the surface-modified particle from actually dissolving in the solvent, i.e., the surface-modified nanoparticles will be dispersed in the solvent, however the compatibility of the surface groups with the solvent will give the surface-modified nanoparticles the appearance of dissolving in the solvent. As the size of the surface-modified nanoparticles increases, the haziness of the solvent generally increases. Preferred surface-modified nanoparticles are selected such that they do not settle out of the solvent. The further step in assessing the compatibility of the solvent and the surface-modified nanoparticles includes determining whether, upon subsequent introduction of a foaming agent, the composition foams.

Suitable surface groups can also be selected based upon the solubility parameter of the surface group and the solvent. Preferably the surface group, or the agent from which the surface group is derived, has a solubility parameter similar to the solubility parameter of the solvent to be foamed. When the solvent to be foamed is hydrophobic, for example, one skilled in the art can select from among various hydrophobic surface groups to achieve a surface-modified particle that is compatible with the hydrophobic solvent. Similarly, when the solvent to be foamed is hydrophilic, one skilled in the art can select from hydrophilic surface groups, and, when the solvent to be foamed is a fluorocarbon, one skilled in the art can select from among various fluorocarbon surface groups. The particle can also include at least two different surface groups that combine to provide a particle having a solubility parameter that is similar to the solubility parameter of the solvent.

The surface groups may be selected to provide a statistically averaged, randomly surface-modified particle.

The surface groups are present on the surface of the particle in an amount sufficient to provide surface-modified nanoparticles that are capable of being subsequently dispersed in the solvent without aggregation. The surface groups preferably are present in an amount sufficient to form a monolayer, preferably a continuous monolayer, on the surface of the particle.

Surface-modifying groups may be derived from surface-modifying agents. Schematically, surface-modifying agents can be represented by the formula A-B, where the A group is capable of attaching to the surface of the particle and the B group is a compatibilizing group that may be reactive or non-reactive with a component of the composition. Compatibilizing groups can be selected to render the particle relatively more polar, relatively less polar, or relatively non-polar.

Suitable classes of surface-modifying agents include, e.g., silanes, organic acids, organic bases, and alcohols.

Particularly useful surface-modifying agents include silanes. Examples of useful silanes include organosilanes, including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltrilsopropoxysilane, vinyltrimethoxysilane, vinyltriphenoxysilane, vinyltri(t-butoxy)silane, vinyltris(isobutoxy)silane, vinyltris(isopropenoxy)silane and vinyltris(2-methoxyethoxy)silane; trialkoxyarylsilanes; isooctyltrimethoxy-silane; N-(3-triethoxysilylpropyl) methoxyethoxyethoxy ethyl carbamate; N-(3-triethoxysilylpropyl) methoxyethoxyethoxyethyl carbamate; silane functional (meth)acrylates, including, e.g., 3-(methacryloyloxy) propyltrimethoxysilane, 3-acryloyloxypropyltrimethoxysilane, 3-(methacryloyloxy) propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)methyltriethoxysilane, 3-(methacryloyloxy)methyltrimethoxysilane, 3-(methacryloyloxy)propyldimethylethoxysilane, 3-(methacryloyloxy)propenyltrimethoxysilane, and 3-(methacryloyloxy) propyltrimethoxysilane; polydialkylsiloxanes, including, e.g., polydimethylsiloxane, arylsilanes, including, e.g., substituted and unsubstituted arylsilanes, alkylsilanes, including, e.g., substituted and unsubstituted alkyl silanes, including, e.g., methoxy and hydroxy substituted alkyl silanes, and combinations thereof.

Methods of surface-modifying silica using silane functional (meth)acrylates are described, e.g., in U.S. Pat. Nos. 4,491,508 and 4,455,205 (Olsen et al.); U.S. Pat. Nos. 4,478,876 and 4,486,504 (Chung); and U.S. Pat. No. 5,258,225 (Katsamberis), and incorporated by reference herein.

Useful organic acid surface-modifying agents include, e.g., oxyacids of carbon (e.g., carboxylic acid), sulfur and phosphorus, and combinations thereof.

Representative examples of polar surface-modifying agents having carboxylic acid functionality include $CH_3O(CH_2CH_2O)_2CH_2COOH$ (hereafter MEEAA) and 2-(2-methoxyethoxy)acetic acid having the chemical structure $CH_3OCH_2CH_2OCH_2COOH$ (hereafter MEAA) and mono (polyethylene glycol) succinate.

Representative examples of non-polar surface-modifying agents having carboxylic acid functionality include octanoic acid, dodecanoic acid, and oleic acid.

Examples of suitable phosphorus containing acids include phosphonic acids, including, e.g., octylphosphonic acid, laurylphosphonic acid, decylphosphonic acid, dodecylphosphonic acid, and octadecylphosphonic acid.

Useful organic base surface-modifying agents include, e.g., alkylamines, including, e.g., octylamine, decylamine, dodecylamine, and octadecylamine.

Examples of other useful non-silane surface-modifying agents include acrylic acid, methacrylic acid, beta-carboxyethyl acrylate, mono-2-(methacryloyloxyethyl) succinate, and combinations thereof. A useful surface-modifying agent that imparts both polar character and reactivity to the nanoparticles is mono(methacryloyloxypolyethyleneglycol) succinate.

Examples of suitable surface-modifying alcohols include, e.g., aliphatic alcohols, including, e.g., octadecyl, dodecyl, lauryl and furfuryl alcohol, alicyclic alcohols, including, e.g., cyclohexanol, and aromatic alcohols, including, e.g., phenol and benzyl alcohol, and combinations thereof.

When the solvent includes aromatic ring containing epoxy resins, useful surface-modifying groups can include an aromatic ring. Examples of surface-modifying groups particularly suitable for epoxy resin compositions are disclosed in U.S. Pat. No. 5,648,407 (Goetz et al.), and incorporated by reference herein.

A variety of methods are available for modifying the surface of nanoparticles, including, e.g., adding a surface-modifying agent to nanoparticles (e.g., in the form of a powder or a colloidal dispersion) and allowing the surface-modifying agent to react with the nanoparticles. Other useful surface modification processes are described in, e.g., U.S. Pat. Nos. 2,801,185 (Iler) and 4,522,958 (Das et al.), and incorporated by reference herein.

Preferably the nanoparticles are inorganic. Examples of suitable inorganic nanoparticles include silica and metal oxide nanoparticles, including zirconia, titania, ceria, alumina, iron oxide, vanadia, antimony oxide, tin oxide, alumina/silica, and combinations thereof. The nanoparticles have an average particle diameter less than about 100 nm, preferably no greater than about 50 nm, more preferably from about 3 nm to about 50 nm, even more preferably from about 3 nm to about 20 nm, most preferably from about 3 nm to about 10 nm. If the nanoparticles are aggregated, the maximum cross-sectional dimension of the aggregated particle is within any of these preferable ranges.

Useful surface-modified zirconia nanoparticles include a combination of oleic acid and acrylic acid adsorbed onto the surface of the particle.

Useful surface-modified silica nanoparticles include silica nanoparticles surface modified with silane surface-modifying agents, including, e.g., acryloyloxypropyl trimethoxysilane, 3-methacryloyloxypropyltrimethoxysilane, heptamethyl(2-[tris(2-methoxyethoxy)silylethyl]trisiloxane, 3-mercaptopropyltrimethoxysilane, n-octyltrimethoxysilane, isooctyltrimethoxysilane, and combinations thereof. Silica nanoparticles can be treated with a number of surface-modifying agents, including, e.g., alcohol, organosilane, including, e.g., alkyltrichlorosilanes, trialkoxyarylsilanes, trialkoxy(alkyl)silanes, and combinations thereof and organotitanates and mixtures thereof.

The nanoparticles may be in the form of a colloidal dispersion. Examples of useful commercially available unmodified silica starting materials include nano-sized colloidal silicas, available under the product designations NALCO 1040, 1050, 1060, 2326, 2327, and 2329 colloidal silica from Nalco Chemical Co., Naperville, Ill.

Useful metal oxide colloidal dispersions include colloidal zirconium oxide, suitable examples of which are described in U.S. Pat. No. 5,037,579, and incorporated by reference herein, and colloidal titanium oxide, useful examples of which are described in PCT Publication No. WO 00/06495, entitled "Nanosize Metal Oxide Particles for Producing Transparent Metal Oxide Colloids and Ceramers," (Arney et al.), filed Jul. 30, 1998, and incorporated by reference herein.

Various methods may be employed to combine the surface-modified nanoparticles and the solvent. In one method, a colloidal dispersion of surface-modified nanoparticles and solvent are combined. Solvent present in the composition from the colloidal dispersion may then be removed, leaving the surface-modified nanoparticles dispersed in the solvent. The solvent from the colloidal dispersion may be removed by evaporation, including, e.g., distillation or rotary evaporation. Optionally, for some colloidal dispersions, e.g., aqueous colloidal dispersions, prior to addition of the solvent, a cosolvent (e.g., methoxy-2-propanol or N-methylpyrrolidone) may be added to the colloidal dispersion to assist removal of water. After the solvent is added, the water and cosolvent are removed.

Another method for incorporating colloidal dispersions of surface-modified nanoparticles into a solvent includes drying the colloidal dispersion of surface-modified nanoparticles to a powder, followed by addition of the solvent or at least one component of the solvent into which the nanoparticles are to be dispersed. The drying step may be accomplished by conventional means such as oven drying or spray drying. The surface-modified nanoparticles preferably have a sufficient amount of surface groups to prevent irreversible agglomeration or irreversible aggregation upon drying. The drying time and the drying temperature is preferably minimized for nanoparticles having less than 100% surface coverage.

Colloidal dispersions of surface-modified nanoparticles can be added to the solvent in amounts sufficient to provide a composition capable of foaming, preferably in amounts sufficient to provide a composition capable of forming a persistent foam. Surface-modified nanoparticles may be present in the composition in varying amounts, including, e.g., from about 0.01% by dry weight to about 70% by dry weight, preferably from about 0.5% by dry weight to about 30% by dry weight, more preferably from about 0.8% by dry weight to about 30% by dry weight, more preferably from about 1% by dry weight to about 10% by dry weight, most preferably from about 1% by dry weight to about 10% by dry weight, based on the total weight of the composition. The surface-modified nanoparticles are preferably dispersed throughout the solvent, more preferably dispersed homogeneously throughout the solvent.

A cosolvent can be added to the composition to improve the compatibility (e.g., solubility or miscibility) of the surface-modifying agent and the surface-modified particles with the other components of the composition.

Prior to foaming, the solvent is preferably a liquid, including, e.g., solution, emulsion, suspension, and dispersion.

Example solvents include inorganic liquids such as water and organic liquids, including, e.g., acids, alcohols, ketones, aldehydes, amines, ethers, hydrocarbons, petroleum oils, halocarbons, monomers, oligomers, and polymers.

The solvent can also include other ingredients, including, e.g., flow control agents, fillers, and glass and polymer microspheres. The composition is preferably foamed after the surface-modified nanoparticles have become dispersed throughout the solvent, more preferably after the surface-modified nanoparticles are homogeneously dispersed throughout the solvent. The composition can be foamed according to a variety of foaming methods, including those described in, e.g., U.S. Pat. Nos. 5,024,880; 4,895,745; and 4,748,061 (Vesley et al.).

The composition is foamed by forming gas voids in the composition using a variety of mechanisms, including, e.g., mechanical mechanisms, chemical mechanisms, and combinations thereof.

Useful mechanical foaming mechanisms include, e.g., agitating, e.g., shaking, stirring, or whipping the composition and combinations thereof, injecting gas into the composition, e.g., inserting a nozzle beneath the surface of the composition and blowing gas into the composition, and combinations thereof.

Useful chemical foaming mechanisms include, e.g., producing gas in situ through a chemical reaction, decomposition of a component of the composition, including, e.g., a component that liberates gas upon thermal decomposition, evaporating a component of the composition, including, e.g., a liquid gas, volatilizing a gas in the composition by decreasing the pressure on the composition or heating the composition, and combinations thereof.

In principle, any foaming agent may be used to foam the composition, including, e.g., chemical foaming agents and physical foaming agents, including, e.g., inorganic and organic foaming agents.

Examples of chemical foaming agents include water and azo-, carbonate- and hydrazide-based molecules, including, e.g., 4,4'-oxybis (benzenesulfonyl)hydrazide, 4,4'-oxybenzenesulfonyl semicarbazide, azodicarbonamide, p-toluenesulfonyl semicarbazide, barium azodicarboxylate, azodiisobutyronitrile, benzenesulfonhydrazide, trihydrazinotriazine, metal salts of azodicarboxylic acids, oxalic acid hydrazide, hydrazocarboxylates, diphenyloxide-4,4'-disulphohydrazide, tetrazole compounds, sodium bicarbonate, ammonium bicarbonate, preparations of carbonate compounds and polycarbonic acids, and mixtures of citric acid and sodium bicarbonate, N,N'-dimethyl-N,N'-dinitrosoterephthalamide, N,N'-dinitrosopentamethylenetetramine, and combinations thereof.

Suitable inorganic physical foaming agents include, e.g., nitrogen, argon, oxygen, water, air, helium, sulfur hexafluoride, and combinations thereof.

Useful organic physical foaming agents include carbon dioxide, aliphatic hydrocarbons, aliphatic alcohols, fully and partially halogenated aliphatic hydrocarbons, including, e.g., methylene chloride, and combinations thereof. Examples of suitable aliphatic hydrocarbon foaming agents include members of the alkane series of hydrocarbons, including, e.g., methane, ethane, propane, n-butane, isobutane, n-pentane, isopentane, and blends thereof. Useful aliphatic alcohols include, e.g., methanol, ethanol, n-propanol, isopropanol, and combinations thereof. Suitable fully and partially halogenated aliphatic hydrocarbons include, e.g., fluorocarbons, chlorocarbons, chlorofluorocarbons, and combinations thereof.

The foaming agents may be used as single components, in mixtures and combinations thereof, as well as in mixtures with other co-foaming agents. The foaming agent is added to the composition in an amount sufficient to achieve a desired foam density.

The solvent may also include a nucleating agent. A nucleating agent can be any conventional nucleating agent. The amount of nucleating agent to be added depends upon the desired cell size, the selected foaming agent, and the density of the solvent. Examples of inorganic nucleating agents in small particulate form include clay, talc, silica, and diatomaceous earth. Organic nucleating agents can decompose or react at a given temperature.

One example of an organic nucleating agent is a combination of an alkali metal salt of a polycarboxylic acid with a carbonate or bicarbonate. Examples of useful alkali metal salts of a polycarboxylic acid include the monosodium salt of 2,3-dihydroxy-butanedioic acid (i.e., sodium hydrogen tartrate), the monopotassium salt of butanedioic acid (i.e., potassium hydrogen succinate), the trisodium and tripotassium salts of 2-hydroxy-1,2,3-propanetricarboxylic acid (i.e., sodium and potassium citrate, respectively), and the disodium salt of ethanedioic acid (i.e., sodium oxalate) and polycarboxylic acid, such as 2-hydroxy-1,2,3-propanetricarboxylic acid, and combinations thereof. Examples of carbonate and bicarbonate include sodium carbonate, sodium bicarbonate, potassium bicarbonate, potassium carbonate, calcium carbonate, and combinations thereof. One contemplated combination is a monoalkali metal salt of a polycarboxylic acid, such as monosodium citrate or monosodium tartrate, with a carbonate or bicarbonate. It is contemplated that mixtures of different nucleating agents may be added to the solvent. Other useful nucleating agents include a stoichiometric mixture of citric acid and sodium bicarbonate.

EXAMPLES

Glossary

"Drilling Fluid" is a non-aqueous proprietary fluid obtained from INVETEP, Venezuela.

"FC-100" is a fluoroalkyl sulfonate-based surfactant composition, available from 3M Company, St. Paul, Minn., as FC-100 FLUORAD Brand Fluorochemical Surfactant.

"FC-740" is a fluoroaliphatic polymeric esters-based surfactant composition, available from 3M Company, as FC-740 FLUORAD Brand Well Stimulation Additive.

Preparation of Heptamethyl(2-[tris(2-methoxyethoxy)silyll-ethyl)trisiloxane Coupling Agent Heptamethyl(2-[tris(2-methoxyethoxy)silyl]ethyl)trisiloxane Coupling Agent ("Silane Coupling Agent A") was prepared by combining 25.20 grams (g) tris(2-methoxyethoxy)vinylsilane (Aldrich Chemical Co., Milwaukee, Wis.) and 20.00 g heptamethyldisiloxane (Gelest, Inc., Tullytown, Pa.) with mixing in 30 g heptane. One drop of a platinum(0) divinyltetramethyldisiloxane catalyst (prepared according to the procedures in U.S. Pat. No. 3,814,730, and incorporated by reference herein) was added to 0.3 g heptane to form a solution. 0.1 g of this solution was added to the above reaction mixture, which was then allowed to stir in a nitrogen atmosphere, without heating, overnight. The reaction continued until completion as determined by the disappearance of the Si—H peak using infrared spectroscopy (IR). Heptane was removed from the composition by evaporation under reduced pressure to give Silane Coupling Agent A.

Preparation of Surface-Modified Silica Nanoparticles (Particles A)

Silica nanoparticles surface modified with Silane Coupling Agent A were prepared as follows: 200 g NALCO 2326 15% by weight solids ammonia stabilized colloidal silica having an average particle size of 5 nm and a surface area of about 600 meters2/gram (as reported by the manufacturer, Nalco Chemical Co., Naperville, IL.), 37.38 g Silane Coupling Agent A and 388 g 1-methoxy-2-propanol (Aldrich Chemical Company) were combined with mixing in a 1 gallon glass jar. The jar containing the mixture was sealed, placed in a vented oven, and heated overnight at 80° C. The mixtures was then transferred to an evaporating dish for drying and dried in a flow-through oven at 150° C. to produce 24.65 g of a white particulate solid.

Preparation of N-(3-triethoxysilylpropyl)methoxyethoxyethylcarbamate

N-(3-triethoxysilylpropyl)methoxyethoxyethylcarbamate (PEG3TES) was prepared by combining 50.02 g of triethyleneglycol monomethyl ether and 46 g methylethyl ketone in a round bottom flask with stirring. 3-(triethoxysilyl)propylisocyanate (76.03 g) was added to the mixture and mixed. Dibutyl dilaurate (approximately 3 mg) was added to the mixture and the mixture was stirred for about 16 hours. Most of the methylethyl ketone was removed at reduced pressure on a rotary evaporator at a temperature of about 70° C. Additional triethyleneglycol monomethyl ether (0.1 g) was added to the mixture to react with the remaining isocyanate that was detected by IR Spectroscopy.

Preparation of Surface-Modified Silica Nanoparticles (Particles B)

NALCO 2326 (15 g), PEG3TES (92.29 g), and deionized water (16.88 g; 18 megohm) was added into a flask and hand shaken. The mixture was heated overnight in an 80° C. oven (approximately 18 hours) to form a sol having about 11.5 wt. % solids.

Foaming Method

Five g of the solution to be foamed was weighed out into a 30 mL fine fritted filter flask. The fritted filter had a pore size of from 4 to 5.5 micrometers. The height of the flask from the fritted filter to the top was about 15 cm. Nitrogen gas was blown through the frit at a constant indicated pressure of 5 psi. "Foam time" is the time required for the foam to flow over the top of the flask or 5 minutes, whichever occurs first, and is measured from the time the gas begins to flow through the frit. The "end foam height" is the height of the foam in cm after five minutes if the foam has not overflowed the flask. The "foam collapse time" is the time at which there was no longer a continuous ring of foam bubbles at the air/liquid/flask interface measure from the point at which the nitrogen gas is turned off.

Example 1

Two wt. % of Particles A was added to Drilling Fluid and the composition was foamed according the method described above. Comparative Examples 1 and 2 contained 2 wt. % FC 100 and FC 740 in Drilling Fluid and were tested as described above. Each sample was measured for Foam Height, Foam Time, and Foam Collapse Time. The results of the testing are shown below in Table 1.

TABLE 1

| Sample | End Foam Height | Foam Time | Foam Collapse Time |
| --- | --- | --- | --- |
| Example 1 | Overflowed | 5 seconds | 6 minutes, 30 seconds |
| CE-1 | Overflowed | 5 seconds | 25 seconds |
| CE-2 | Overflowed | 5 minutes | >3 hours |

CE = Comparative Example

Examples 2–6

Particles B was added to water in the amounts of 0.01, 0.1, 0.5, 1.0, and 1.3 wt. %, respectively, and the composition was foamed according the method described above. Comparative Examples 3–5 contained 0.1 wt. % FC-100 (CE-3), 0.5 wt. % FC-100 (CE-4), and 0.5 wt. % FC-740 (CE-5) in deionized water. The comparative examples were also foamed according to the method described above. The results of the foam test for each sample are shown below in Table 2.

TABLE 2

| Sample | End Foam Height | Foam Time | Foam Collapse Time |
| --- | --- | --- | --- |
| Example 2 | Overflowed | 4 minutes, 45 seconds | 15 seconds |
| Example 3 | 3 cm | 5 minutes | 3 minutes, 45 seconds |
| Example 4 | 0.7 cm | 5 minutes | 18 minutes |
| Example 5 | 1.6 cm | 5 minutes | 19 minutes, 30 seconds |
| Example 6 | Overflowed | 3 minutes | 43 minutes, 10 seconds |
| CE-3 | Overflowed | 30 seconds | >3 hours |
| CE-4 | Overflowed | 4 seconds | >3 hours |
| CE-5 | Overflowed | 30 seconds | >3 hours |

CE = Comparative Example

Examples 7–8

An aqueous stock solution (density of 1 g/mL at 25° C.) containing PEMULEN 1621 (1 g) (from Noveon), 18 MΩ Millipore water (499 g), and 5 drops of triethanolamine (neutralizer) was prepared. A non-aqueous stock solution was prepared as above, except diesel oil was substituted for water. The density of this solution was 0.814 g/mL.

Particles B were added to 100 mL of the aqueous stock solution in the amount of 1% by weight (Example 7). Particles 100 mL were added to 100 mL of the non-aqueous stock solution in the amount of 1% by weight (Example 8). Comparative Examples 6–7 contained no surfactant (CE-6) and 1% by weight FC-100 (CE-7) in the aqueous solution and Comparative Examples 8–9 contained no surfactant (CE-8) and 1% by weight FC-740 (CE-9) in the non-aqueous solution.

Each of Examples 7–8 and Comparative Examples 6–9 were stirred for 5 minutes in a graduated cylinder at 8000 rpm using a Silverson LAR laboratory mixer from Silverson, East Longmeadow, Mass.). Each sample's volume was recorded on the graduated cylinder before and after mixing. "Time to foam decomposition" was determined to be when a continuous ring of foam did not appear at the liquid/air/cylinder interface. "Final Density" was determined by multiplying the density of the sample by the ratio of the initial height/final height and converting the units to pounds/gallon (ppg). The data are shown in Table 3.

TABLE 3

| Sample | Initial Height (mL) | Final Height (mL) | Time to Decomposition (minutes) | Final Density (ppg) |
|---|---|---|---|---|
| Example 6 | 100 | 175 | 300 | 4.8 |
| Example 7 | 100 | 160 | 90 | 4.3 |
| CE-6 | 100 | 130 | 200 | 6.4 |
| CE-7 | 100 | 325 | >24 hours | 2.6 |
| CE-8 | 100 | 105 | 1 | 6.5 |
| CE-9 | 100 | 275 | >24 hours | 2.5 |

What is claimed is:

1. A method of recovering hydrocarbon from a permeable formation comprising the steps of:
    injecting a fluid under pressure into the permeable formation through one or more injection wells; and
    recovering the hydrocarbons through one or more production wells, wherein the fluid foams while under pressure and said foam substantially breaks when the pressure is relieved, the fluid comprising a foam composition comprising solvent, un-agglomerated surface-modified silica nanoparticles or metal oxide nanoparticles surface modified with organic acid, organic base, and combinations thereof, and a foaming agent.

2. The method of claim 1 wherein the foam composition further comprises a surfactant.

3. The method of claim 1 wherein the surface-modified particles are present in an amount of from about 0.01 to about 70 wt. %.

4. The method of claim 1 wherein said nanoparticles have a particle diameter of less than about 100 nanometers.

5. The method of claim 1 wherein said metal oxide nanoparticles are selected from the group consisting of titania, alumina, zirconia, vanadia, ceria, iron oxide, antimony oxide, tin oxide, aluminum/silica, and combinations thereof.

6. The method of claim 1 wherein said nanoparticles comprise surface groups selected from the group consisting of hydrophobic groups, hydrophilic groups, and combinations thereof.

7. The method of claim 1 wherein said silica nanoparticles comprise surface groups derived from an agent selected from the group consisting of silane, organic acid, organic base, and combinations thereof.

8. The method of claim 1 wherein said solvent is selected from the group consisting of water, acids, alcohols, ketones, aldehydes, amines, ethers, hydrocarbons, petroleum oils, halocarbons, monomers, oligomers, polymers, and combinations thereof.

9. The method of claim 1 wherein said foaming agent is selected from the group consisting of liquid, gas, and solid foaming agents, and combinations thereof.

10. The method of claim 1 wherein said foaming agent comprises a gas selected from the group consisting of air, nitrogen, oxygen, carbon dioxide, helium, argon, nitrous oxide, and mixtures thereof.

11. The method of claim 1 wherein said solvent comprises water.

12. The method of claim 1 wherein the solvent comprises non-aqueous fluids.

13. A method of removing debris from a well using a drilling fluid comprising the steps of:
    injecting under pressure a foamed drilling fluid into the well;
    contacting the debris with the foamed drilling fluid; and
    directing the debris and foamed drilling fluid out of the well, wherein the drilling fluid comprises a foam composition comprising solvent, foaming agent, un-agglomerated and surface-modified silica nanoparticles or metal oxide nanoparticles surface modified with organic acid, organic base, and combinations thereof, disposed in said solvent.

14. The method of claim 13 wherein the foam composition further comprises a surfactant.

15. The method of claim 13 wherein the surface-modified particles are present in an amount of from about 0.01 to about 70 wt. %.

16. The method of claim 13 wherein said nanoparticles have a particle diameter of less than about 100 nanometers.

17. The method of claim 13 wherein said metal oxide nanoparticles are selected from the group consisting of titania, alumina, zirconia, vanadia, ceria, iron oxide, antimony oxide, tin oxide, aluminum/silica, and combinations thereof.

18. The method of claim 13 wherein said nanoparticles comprise surface groups selected from the group consisting of hydrophobic groups, hydrophilic groups, and combinations thereof.

19. The method of claim 13 wherein said silica nanoparticles comprise surface groups derived from an agent selected from the group consisting of silane, organic acid, organic base, and combinations thereof.

20. The method of claim 13 wherein said solvent is selected from the group consisting of water, acids, alcohols, ketones, aldehydes, amines, ethers, hydrocarbons, petroleum oils, halocarbons, monomers, oligomers, polymers, and combinations thereof.

21. The method of claim 13 wherein said foaming agent is selected from the group consisting of liquid, gas, and solid foaming agents, and combinations thereof.

22. The method of claim 13 wherein said foaming agent comprises a gas selected from the group consisting of air, nitrogen, oxygen, carbon dioxide, helium, argon, nitrous oxide, and mixtures thereof.

23. The method of claim 13 wherein said solvent comprises water.

24. The method of claim 13 wherein the solvent comprises non-aqueous fluids.

25. A method for controlling the mobility of a fluid in a hydrocarbon-bearing formation comprising the step of:
   incorporating a foam into the hydrocarbon-bearing formation in association with a fluid to control the mobility of said fluid, wherein said foam is formed from a foam composition comprising foaming agent, solvent, and un-agglomerated surface-modified silica nanoparticles or metal oxide nanoparticles surface modified with organic acid, organic base, and combinations thereof, disposed in said solvent.

26. The method of claim 25 wherein the foam composition further comprises a surfactant.

27. The method of claim 25 wherein the surface-modified particles are present in an amount of from about 0.01 to about 70 wt. %.

28. The method of claim 25 wherein said nanoparticles have a particle diameter of less than about 100 nanometers.

29. The method of claim 25 wherein said metal oxide nanoparticles are selected from the group consisting of titania, alumina, zirconia, vanadia, ceria, iron oxide, antimony oxide, tin oxide, aluminum/silica, and combinations thereof.

30. The method of claim 25 wherein said nanoparticles comprise surface groups selected from the group consisting of hydrophobic groups, hydrophilic groups, and combinations thereof.

31. The method of claim 25 wherein said silica nanoparticles comprise surface groups derived from an agent selected from the group consisting of silane, organic acid, organic base, and combinations thereof.

32. The method of claim 25 wherein said solvent is selected from the group consisting of water, acids, alcohols, ketones, aldehydes, amines, ethers, hydrocarbons, petroleum oils, halocarbons, monomers, oligomers, polymers, and combinations thereof.

33. The method of claim 25 wherein said foaming agent is selected from the group consisting of liquid, gas, and solid foaming agents, and combinations thereof.

34. The method of claim 25 wherein said foaming agent comprises a gas selected from the group consisting of air, nitrogen, oxygen, carbon dioxide, helium, argon, nitrous oxide, and mixtures thereof.

35. The method of claim 25 wherein said solvent comprises water.

36. The method of claim 25 wherein the solvent comprises non-aqueous fluids.

37. A hydrocarbon formation comprising:
   a hydrocarbon formation containing hydrocarbon and a foam composition, wherein the foam composition comprises foaming agent, solvent, and un-agglomerated surface-modified silica nanoparticles or metal oxide nanoparticles surface modified with organic acid, organic base, and combinations thereof, disposed in said solvent.

38. The formation of claim 37 wherein the foam composition further comprises a surfactant.

39. The formation of claim 37 wherein the surface-modified particles are present in an amount of from about 0.01 to about 70 wt. %.

40. The formation of claim 37 wherein said nanoparticles have a particle diameter of less than about 100 nanometers.

41. The formation of claim 37 wherein said metal oxide nanoparticles are selected from the group consisting of titania, alumina, zirconia, vanadia, ceria, iron oxide, antimony oxide, tin oxide, aluminum/silica, and combinations thereof.

42. The formation of claim 37 wherein said nanoparticles comprise surface groups selected from the group consisting of hydrophobic groups, hydrophilic groups, and combinations thereof.

43. The formation of claim 37 wherein said silica nanoparticles comprise surface groups derived from an agent selected from the group consisting of silane, organic acid, organic base, and combinations thereof.

44. The formation of claim 37 wherein said solvent is selected from the group consisting of water, acids, alcohols, ketones, aldehydes, amines, ethers, hydrocarbons, petroleum oils, halocarbons, monomers, oligomers, polymers, and combinations thereof.

45. The formation of claim 37 wherein said foaming agent is selected from the group consisting of liquid, gas, and solid foaming agents, and combinations thereof.

46. The formation of claim 37 wherein said foaming agent comprises a gas selected from the group consisting of air, nitrogen, oxygen, carbon dioxide, helium, argon, nitrous oxide, and mixtures thereof.

47. The formation of claim 37 wherein said solvent comprises water.

* * * * *

UNITED STATES PATENT AND TRADEMARK OFFICE
CERTIFICATE OF CORRECTION

PATENT NO. : 7,033,975 B2  Page 1 of 1
APPLICATION NO. : 10/441721
DATED : April 25, 2006
INVENTOR(S) : Jimmie R. Baran, Jr.

It is certified that error appears in the above-identified patent and that said Letters Patent is hereby corrected as shown below:

Title page,
Item (56), References Cited, U.S. PATENT DOCUMENTS, delete "6,586,483 B1" and insert in place thereof -- 6,586,483 B2 --.

Column 4,
Line 67, delete "vinyltrilsopropoxysilane" and insert in place thereof -- vinyltriisopropoxysilane --.

Column 6,
line 25, delete "silyllethyl)" and insert in place thereof -- silyl]ethyl) --.

Column 9,
Line 13, delete "silyll" and insert in place thereof -- silyl] --.

Column 11,
Line 20, delete "LAR" and insert in place thereof -- L4R --.

Column 14,
Line 10, delete "acid." and insert in place thereof -- acid, --.

Signed and Sealed this

Twenty-seventh Day of March, 2007

JON W. DUDAS
*Director of the United States Patent and Trademark Office*